United States Patent

Litchfield et al.

[15] 3,679,792
[45] July 25, 1972

[54] DIALDEHYDE-CONTAINING ANTI-CARIES CHEWING GUM COMPOSITIONS

[72] Inventors: John H. Litchfield, Worthington; Victor G. Vely, Columbus, both of Ohio

[73] Assignee: Wm. Wrigley Jr., Company, Chicago, Ill.

[22] Filed: Sept. 5, 1969

[21] Appl. No.: 855,763

[52] U.S. Cl. .............................................. 424/48, 424/333
[51] Int. Cl. ........................................................ A61k 27/00
[58] Field of Search ................................... 424/48–58, 333

[56] References Cited

UNITED STATES PATENTS

| | | | |
|---|---|---|---|
| 2,801,216 | 7/1957 | Yoder et al. | 424/333 |
| 3,497,590 | 2/1970 | Eigen | 424/49 |

OTHER PUBLICATIONS

Chemical Abstracts, Vol. 63, entry 7232h– 7233a,1965
Derwent, Farmdoc No. 12,992, Abstracting Japanese Patent No. 10232/64 published 6/1964
Stack, Industrial and Engineering Chemistry, Vol. 49, No. 5, pages 913– 917, May 1957

*Primary Examiner*—Richard L. Huff
*Attorney*—Le Blanc & Shur

[57] ABSTRACT

Unique chewing gum compositions possessing anti-caries activity characteristics comprising a chewing gum base having incorporated therein at least one anti-microbial agent comprising saturated or unsaturated, substituted or unsubstituted, conjugated or unconjugated dialdehydes. The chewing compositions can and preferably do contain conventional adhesive as well as conventional flavoring agents.

10 Claims, No Drawings

DIALDEHYDE-CONTAINING ANTI-CARIES CHEWING GUM COMPOSITIONS

The present composition contemplates novel and unique chewing gum compositions possessing anti-caries activity which upon chewing have the ability to inhibit the growth of oral microorganisms and the formation of acids in the oral cavity, thereby providing protection for extended periods, even after the gum composition has been chewed or masticated and discarded.

Heretofore, it has been generally known and accepted that the elaboration of acid through the breakdown of readily fermentable carbohydrates, by the action of acidogenic oral bacteria, is a primary cause of dental caries. The method of mechanism of dental caries is generally characterized by a decalcification of the inorganic portion of the tooth and is accompanied by or followed by a disintegration of the organic matrix. The acids are formed on the tooth surface, and, if they are not neutralized or otherwise destroyed, the demineralization of the tooth will proceed.

Dentifrices and similar preparations applied to the tooth surfaces and gums have been one means heretofore customarily employed in the cleaning of teeth; and, in addition, certain proposals have been advanced relative to development of medicated dentifrices having the ability to inhibit tooth decay and for the control of dental caries. Many of such medicated dentifrices contain various inhibiting agents, such as fluorides and amides.

Another means of control of dental caries involves the use of sodium fluoride by its addition to drinking water to provide a systemic effect, or by its topical application to tooth surfaces, and has been accorded some degree of acceptance in this regard in the field. Still another means of control of dental caries involves the use of antibiotics, such as penicillin, and has produced some desirable results in control of dental caries; by this means is not without certain disadvantages involving sensitization of the patient, thereby limiting its value as a means of control of dental caries.

While numerous means have been heretofore proposed as potential candidates for inhibiting or neutralizing acid formation in the oral cavity as illustrated above, it appears that the problem of control of dental caries is much more complex and is not readily amenable to control by the application of conventional dentifrice preparations by the consumer once or twice a day. It appears that it is necessary for proper control of dental caries that any substance capable of inhibiting the growth of bacteria in the oral cavity should have a sufficiently prolonged effect such that after introduction into the oral cavity sufficient protection would be provided to inhibit the degradation process between periods of application, if not longer. Conventional dentifrices fail to provide such protection, and there is also the disadvantage with dentifrices that the materials are soon washed from the oral cavity, which lessens the time the active ingredients are in contact with the microorganisms.

It is apparent, therefore, that suitable means and compositions are lacking for combating the growth of oral microorganisms and acids during the periods between application of the same to the oral cavity.

It is accordingly one object of the present invention to provide an anti-caries composition in the form of a chewing gum which eliminates many of the disadvantages normally associated with the use of conventional dentifrices customarily employed for the purpose of control of dental caries.

Another object of the invention resides in the provisions of chewing gum compositions having anti-caries activity which are not only effective for inhibiting the formation or growth of oral microorganisms in the oral cavity, but also effective against the formation of the acids for a period of time after completion of chewing. Thus, the chewing gum compositions would provide protection not only while they are being masticated or chewed, but even after they have been discarded.

Yet another object of the invention resides in the provision of chewing gum compositions containing a dialdehyde which may be saturated or unsaturated, substituted or unsubstituted, conjugated or unconjugated, said aldehyde being readily releasable upon mastication in the oral cavity or by interface contact between the gum and teeth, so as to be capable of inhibiting 50 percent or more of the growth of the microorganisms and the formation of acids in the oral cavity for prolonged periods of time. A still further object of the invention resides in the provision of a gum composition containing a dialdehyde of the group glyoxal, glutaraldehyde, succinic dialdehyde, 2,4-hexadienal mesoxalic dialdehyde, 2-hydroxyadipaldehyde, dialdehyde starch, and dialdehyde galactomannan gum, which aldehydes are readily releasable upon mastication in the oral cavity or upon mastication through interfacial contact between the teeth and the gum so as to inhibit 50 percent or more of the growth of the microorganisms and the formation of acids in the oral cavity for prolonged periods of time.

These and other objects and advantages of the present invention will become further apparent from the teachings hereinafter provided by the detailed description and specific examples. In accordance with the above objects, it has been discovered that dialdehydes of the class described (saturated, unsaturated, substituted, unsubstituted, conjugated, unconjugated) exhibit excellent inhibition of lactic acid formation (50 percent or greater) and growth of oral streptococci and bacilli. As a result of extensive studies and experimental tests, both in vitro and simulated in vivo of certain compounds (specifically, glyoxal, glutaraldehyde, succinic dialdehyde, 2,4-hexadienal, mesoxalic dialdehyde, 2-hydroxyadipaldehyde, Dasol A, a water-soluble dialdehyde starch, dialdehyde starch—50 percent oxidized, dialdehyde starch—90 percent oxidized, and dialdehyde galactomannan gum), it has been observed that they exhibit excellent inhibition of lactic acid formation and growth of oral streptococci and lactobacilli in the oral cavity. Additionally, it has been observed that these compounds are readily incorporated into chewing gum bases during chewing gum manufacturing processes and are either released therefrom at rates sufficient to provide the activity desired for control of dental caries or by their contact with the teeth during mastication, provide the level of cariostatic activity sufficient for control of dental caries.

In accordance with the present invention, it has been found that the incorporation of dialdehydes at concentrations of about 0.1 to 5 percent concentration by weight, into chewing gum compositions, will effectively inhibit the formation of lactic acid and the growth of oral microorganisms found in the oral cavity. Specific dialdehydes which have been tested with success include glyoxal, glutaraldehyde, succinic dialdehyde, 2,4-hexadienal, mesoxalic dialdehyde, 2-hydroxyadipaldehyde, Dasol A, a water-soluble dialdehyde starch, dialdehyde starch—50 percent oxidized, dialdehyde starch—90 percent oxidized, and dialdehyde galactomannan gum.

The incorporation of the aforementioned dialdehydes into chewing gum compositions produces an anti-caries effect whether or not the selected dialdehyde is used alone or in combination with one or more members of the class of dialdehydes described. Although it has not yet been determined with certainty, the effect of combinations of dialdehydes, within the limits recommended above, is to reduce to substantially the same degree of formation of acid and growth of oral microorganisms in the oral cavity. It is expected that certain combinations of dialdehydes would exhibit not only an additive effect but in certain cases a synergistic effect.

In order to evaluate the dialdehyde compounds of the classes described above for effectiveness in control of dental caries, many studies and tests, both in vitro and in vivo type, were performed to confirm anti-caries activity. The data obtained as a result of these studies are summarized in tabular form as illustrated and summarized by Tables I, II, III, and IV which follow:

TABLE I

Cariostatic activity of Dialdehydes against Oral Microorganisms in vitro

| Em-No. | Formula pirical | Compound Structural | Name | activity[a] acid-production inhibition, % |
|---|---|---|---|---|
| 1 | $C_2H_2O_2$ | OHCCHO | Glyoxal | ++++ |
| 2 | $C_3H_2O_3$ | OHCCOCHO | Mesoxalic dialdehyde | +[b] |
| 3 | $C_3H_4O_3$ | OHCCHOHCHO | Tartronic dialdehyde | +[c] |
| 4 | $C_4H_4O_2$ | OHCCH:CHCHO | Fumaric-aldehyde | +[c] |
| 5 | $C_4H_6O_2$ | OHCCH$_2$CH$_2$CHO | Succinic dialdehyde | ++++ |
| 6 | $C_4H_6O_3$ | OHCCHOHCH$_2$CHO | α-Hydroxy-succinidi-aldehyde | +[c] |
| 7 | $C_5H_8O_2$ | OHC(CH$_2$)$_3$CHO | Glutaraldehyde | ++++ |
| 8 | $C_6H_6O_2$ | OHCCH:CHCH:CHCHO | 2,4-Hexadienal | ++++ |
| 9 | $C_6H_{10}O_2$ | OHC(CH$_2$)$_4$CHO | Adipaldehyde (hexanedial) | +[c] |
| 10 | $C_6H_{10}O_3$ | OHC(CH$_2$)$_3$CHOHCHO | 2-Hydroxy adipaldehyde | + |
| 11 | $[C_6H_8O_5]_n$ | $-\left[\begin{array}{c}CH\text{---}CH\text{---}O\text{---}CH\text{---}O\\ \vert\quad\quad\vert\quad\quad\quad\vert\\ CHO\quad CH_2OH\quad CHO\end{array}\right]_n$ | Dialdehyde starch (water soluble cationic) | + |
| 12 | | | Dialdehyde galactomannangum (an oxidized polysaccharide) | + | a. Activity was measured by broth-tube assay to determine percent of acid-production inhibition obtained by *Lactobacillus casei* and *Streptococcus* sp. FA-1 in the presence of 0.1% of compound. Symbols designate the following degree of inhibition, percent:
 - 0 to 9       ++ 75 to 89
 +− 10 to 24    +++ 90 to 98
 + 25 to 74     ++++ 99 to 100 b. Confirmation of purity and structure was lacking for this compound. Actual activity would be much higher.

c. These compounds are not available commercially and therefore were not tested in vitro. However, the compounds noted should exhibit the activity shown, and if synthesized, they would be expected to exhibit good anti-caries qualities.

TABLE II

Effectiveness of 2,4-Hexadienal against oral Microorganisms in vitro[a]

| Tube | Compound Concentration, percent | Inhibition of acid production, percent *Streptococcus* sp. FA-1 | *Streptococcus* sp. GS-5 | *Lactobacillus casei* |
|---|---|---|---|---|
| 1 | 0.01 | 31 | 8 | 27 |
| 2 | 0.025 | 92 | 35 | 43 |
| 3 | 0.05 | 99 | 97 | 88 |
| 4 | 0.075 | 99 | 99 | 94 |
| 5 | 0.10 | 100 | 100 | 98 |

[a]2,4-Hexadienal was prepared as an emulsion with 4 parts of Tween 20.

TABLE III

Effect of Salivary Extracts of selected Dialdehydes formulated in Chewing Gum on Mixed Oral Microorganisms[a]

| Experimental Agent | Chewing Gum Percent | Base Formulation | Extraction Method | Chewing time, min. | Degree of inhibition[b] Acid production | growth |
|---|---|---|---|---|---|---|
| Dialdehyde starch | 3.0 | gum base spearmint flavor | Brabender | 60.0 | ++ | + |
| Dialdehyde starch | 5.0 | ditto | Brabender | 60.0 | +++ | + |
| Succinaldehyde | 1.0 | ditto | Barbender | 60.0 | ++ | + | a. Results reported are for a mixed oral inoculum in human saliva after a 24-hour incubation at 37° C in the presence of chewing gum extract.
b. Symbols designate the following degree of inhibition:

For acid-production inhibition, %    For growth inhibition, %
 ++ 75 to 89                         + 90 to 98
 +++ 90 to 98

Assay flasks contained 50% saliva, a portion of which was derived from the Brabender salivary extract of the experimental chewing gum. Final carbohydrate (glucose/sucrose) concentration of the assay flask contents was 8% (glucose/sucrose) derived exclusively from chewing gum.

TABLE IV

Summary of in vivo Evaluation of Dialdehyde Starches and Polysaccharide Gum Determined by Standard Methods of Evaluation[a]

| Agent | Elapsed Test Days | No. of animals on test | Strain and animal | Caries score Mean incidence | Mean extent | Evaluated caries reduction[b] |
|---|---|---|---|---|---|---|
| Dasol A (water-soluble dialdehyde starch) | 56 | 8 | Syrian hamster | 2.0 | 6.0 | + |
| Controls (fortified L-2000 diet) | 56 | 8 | Syrian hamster | 5.8 | 18.0 | − |
| Dialdehyde starch 50% oxidized | 91 | 10 | Osborne-Mendel strain 1 rat | 14.8 | 38.0 | + |
| Controls (fortified RCD diet) | 91 | 10 | Osborne-Mendel strain 1 rat | 17.8 | 45.8 | − |
| Dialdehyde starch 50% oxidized | 89 | 9 | Osborne-Mendel strain 2 rat | 5.9 | 12.7 | ++ |
| Controls (L-2000 diet) | 89 | 8 | Osborne-Mendel strain 2 rat | 9.5 | 21.5 | − |
| Dialdehyde starch 90% oxidized | 92 | 6 | Osborne-Mendel strain 1 rat | 7.0 | 13.5 | ++ |
| Controls (RCD diet) | 92 | 6 | Osborne-Mendel strain 1 rat | 13.8 | 33.3 | − |
| Dialdehyde galactomannan gum | 90 | 7 | Osborne-Mendel strain 1 rat | 15.7 | 42.9 | + |
| Controls (RCD diet) | 90 | 7 | Osborne-Mendel strain 1 rat | 23.3 | 64.8 | − |
| Dialdehyde galactomannan gum | 90 | 8 | Osborne-Mendel strain 2 rat | 3.4 | 5.0 | + |
| Controls (L-2000 diet) | 90 | 8 | Osborne-Mendel strain 2 rat | 6.3 | 10.6 | − |

[a]Dialdehyde starches and polysaccharide gum were incorporated in the diet at a 1% level.
[b]Symbols designate the following approximate degrees of reduction: + 25%, ++ 50%.

As can be observed in Table I, all of the dialdehydes tested exhibit a degree of lactic acid-production inhibition of at least 25-75 percent, whereas certain dialdehydes, such as glyoxal, glutaraldehyde, succinic dialdehyde and 2,4-hexadienal, exhibited an acid-production inhibition of 99-100 percent.

With regard to the inhibition of acid production by specific microorganisms, Table II illustrates the inhibitory effect of 2,4-hexadienal against Streptococcus FA-1, Streptococcus GS-5, and *Lactobacillus casei*, giving separate readings for each microorganism relative to the concentration used.

Table III shows simulated in vivo tests wherein the Brabender special mixer for chewing gum studies was employed as a mechanical means of extracting solubles from large quantities (150 to 175 gram charge) of gum by sterile human saliva. Aliquots of the mechanically prepared, aseptic extracts were assayed for their anti-microbial effect against a mixed oral microbial population. As is shown in Table III, dialdehyde starch and succinaldehyde exhibited excellent acid-production and growth inhibition.

Table IV is illustrative of the reduction of dental caries in vivo using the Syrian hamster and two strains of rats as host species. It can be seen from this table that the mean incidence and the mean extent of dental caries is much lower than that of the controls, using various forms of dialdehyde starches and dialdehyde galactomannan gum. Here there is shown caries reduction of at least 25 percent, using the various forms of dialdehyde starches and the dialdehyde galactomannan gum.

As illustrated by the above data, the dialdehydes are effective in small concentrations both by the in vitro tests and by the in vivo tests. Specific illustrative examples of dialdehydes incorporated into chewing gum bases are set forth hereinafter to illustrate the concentration which can be employed with facility to achieve and assure significant activity levels of at least about 50 percent reduction in acid production and microorganism growth. In the examples which follow, it will be observed that representative dialdehydes have been employed to illustrate preferred embodiments of the invention, and, as is obvious, such examples should in no way be considered as limitative thereon. Also, it will be noted from the examples that the invention is not necessarily restricted to a particular chewing gum base, but rather can be widely applied to chewing gum bases with which the art is well acquainted. In this sense, then, the gum base referred to hereinbefore and hereinafter refers to the non-nutritive, masticatory substance in chewing gum, as defined in the Federal Food, Drug and Cosmetic Act. In the regulation pertinent to chewing gum ingredients under the Food Additives Amendment (Federal Register, p. 4419, May 9, 1962), Paragraph (a) sets forth the ingredients permitted in chewing gum base under the regulation, and Paragraph (c) defines the term "chewing gum base" as meaning "the manufactured or partially manufactured nonnutritive masticatory substance comprised of one or more of the ingredients named and so defined in paragraph (a) of this section." Suitable representative chewing gum bases which can be employed with facility in formulating the chewing gum compositions of the invention are disclosed, for example, in U.S. Pat. No. 2,284,804 of F. T. DeAngelis, and U.S. Pat. No. 2,137,746 of R. L. Wilson.

The flavoring agents which can be used are any of the usual flavoring agents well known in the art. Spearmint, Doublemint, or Juicy Fruit flavoring agents are preferred in the first examples, and P.K. is utilized to designate the coated gum manufactured according to the second example. Whenever and wherever the terms "Spearmint," "Juicy Fruit," "Doublemint" and "P.K." coated gum are used throughout this specification, they refer to products which are sold under the registered trademarks WRIGLEY'S SPEARMINT CHEWING GUM, WRIGLEY'S JUICY FRUIT CHEWING GUM, WRIGLEY'S DOUBLEMINT CHEWING GUM, and WRIGLEY'S P.K. pellet chewing gum, which are the proprietary marks of the Wm. Wrigley Jr. Company of Chicago, Ill.

Where hereinafter designated, the preferred embodiments also include an abhesive, such as a water-soluble hydrolyzable tannin, a water-containing hydrophilic gel and a plasticizer. A typical and representative abhesive which can be employed with facility in the preparation of the chewing gum compositions of the invention will generally contain glycerine, gelatin and tannic acid. A variety of abhesives for chewing gum are disclosed in U.S. Pat. No. 3,255,018, issued June 7, 1966 to Arthur J. Comollo.

Abhesives are used to counteract the tendency of chewing gum compositions to adhere to teeth and particularly to certain types of dentures and artificial teeth. A hydrophilic gel, such as gelatin, in the preferred embodiment when made into a heavy paste with water forms, with a water-soluble, hydrolyzable tannin, such as tannic acid, a hydrogen-bonded adduct, thereby reducing the water solubility of the tannin and decreasing the rate at which it is extracted from the gum. A plasticizer, such as glycerine, is a cosolvent which acts with the water to form a gel of higher viscosity than is obtainable with water alone.

The abhesive, in addition to the plasticized gelatin-tannic acid adduct, may also include amounts of free tannic acid. The plasticized gel functions merely to reduce the rate of tannic acid extractions after the gum is hydrated, and, accordingly, the free tannic acid may be preferred to provide initial abhesive action.

It should be noted that U.S. Pat. No. 3,255,018, describes a wide variety of abhesives and methods of incorporating the said abhesives into chewing gum compositions. An abhesive comprising a plasticized gelatin-tannic acid adduct, together with free tannic acid, is described herein merely as preferred. The chewing gum compositions of this invention may include any desired abhesive and the use of the gelatin-tannic acid adduct and tannic acid is not intended to limit the scope of this invention in any way. Accordingly, the abhesives of U.S. Pat. No. 3,255,018, together with the methods of formulating the said abhesives and including them in chewing gum compositions disclosed therein, and hereby incorporated in their entirety.

The following examples illustrate the incorporation of the anti-caries agents of this invention in each of three basic chewing gum formulations. The first example is a general formula and method of making a stick gum with an anti-caries agent. The second example relates to coated gum, and the third relates to bubble gum. It should be noted that the chewing gum formulations are illustrative only, and may be varied as would be obvious to one skilled in the art without departing from the concept of this invention which specifically includes the incorporation of an anti-caries agent in a chewing gum composition.

Broadly speaking, the anti-caries agent is added in the same manner as the abhesive and flavoring and may be mixed with these agents prior to their incorporation in the gum or added separately as is illustrated in the following examples.

EXAMPLE I

| Ingredients | Parts by Weight | | |
|---|---|---|---|
| | (A) | (B) | (C) |
| Gum base | 20.4 | 20.0 | 20.0 |
| Corn syrup | 20.6 | 20.0 | 20.0 |
| Sugar | 55.7 | 53.2 | 51.2 |
| Corn sugar | 1.6 | 1.6 | 1.6 |
| Gelatin-tannic acid adduct | 2.6 | 2.6 | 2.6 |
| Tannic acid | 0.1 | 0.1 | 0.1 |
| Glycerine | 1.6 | 1.6 | 1.6 |
| Flavor | 0.6 | 0.6 | 0.6 |
| Anti-caries agent | 0.1 | 3.0 | 5.0 |

The gum base is softened by working in a warm mixer maintained at a temperature of 122° F. The gelatin-tannic acid adduct is then added and thoroughly mixed with the softened base. All of the corn syrup is then added, along with the anti-caries agent, followed by two-thirds of the mixture of sugar and corn sugar. When these ingredients are well mixed, the glycerine is added, followed by the balance of the sugar-corn sugar mixture. Subsequently, the tannic acid is added, followed by the flavor, which may be Spearmint, Doublemint, or Juicy Fruit. As soon as the last ingredients are thoroughly mixed, the batch is discharged, allowed to cool slightly, sheeted and scored in the usual fashion.

Columns (A), (B), and (C) represent the parts by weight of stick chewing gum formulations when the anti-caries agent is 0.1, 3.0 and 5.0 parts by weight of the mixture. The anti-caries agents used were either glyoxal, mesoxalic dialdehyde, succinic dialdehyde, glutaraldehyde, 2,4-hexadienal, 2-hydroxyadipaldehyde, dialdehyde starch, or dialdehyde galactomannan gum. These compounds may be used alone or in combination of two or more in total parts by weight of from 0.1 to 5.0, as desired.

EXAMPLE II

The following example is a generalized formula for a coated gum formulation, such as WRIGLEY'S P.K. pellet chewing gum. The anti-caries agents are those listed in Example I, specifically glyoxal, mesoxalic dialdehyde, succinic dialdehyde, glutaraldehyde, 2,4-hexadienal, 2-hydroxyadipaldehyde, dialdehyde starch, or dialdehyde galactomannan gum. The anti-caries agent may be added as an ingredient to either the center or the coating or interspersed throughout both in a weight percent from 0.1 to 5.0, as desired. As in Example I, the agent may be a single dialdehyde or a combination of two or more totalling from 0.1 to 5.0 weight percent of the total coated gum composition.

| Center | Percent by Weight |
|---|---|
| Glycerine | 0.76 |
| Sugar | 50.43 |
| Corn Syrup | 20.93 |
| Corn sugar | 1.90 |
| Flavor | 0.76 |
| Gum base | 25.22 |

| Coating | |
|---|---|
| Carnauba wax | 0.01 |
| Sugar | 92.49 |
| Gum Arabic | 5.52 |
| Dextrin | 1.38 |
| Flavor | 0.60 |

The centers are mixed as described in Example I and may include an abhesive agent as therein described, as desired. If the anti-caries agent is to be added in whole or in part to the center, the procedure of Example I is followed.

After the centers are sheeted and cooled, they are broken into individual pieces. A weighted quantity of centers is added to each coating pan. A sugar syrup and a gum arabic solution are prepared for the coating operation. The rotation of the coating pan begins and a dipper of the syrup-gum arabic mixture is added to the centers. Warm air is used to dry the mixture on the centers. Flavor is added at appropriate intervals during the coating operation. If the anti-caries agent is to be added to the coating, it may be added with the flavor. The gum arabic is eliminated from the coating mixture and only syrup is used during the second coat. Forty coats in all are applied. The finished pieces are polished with Carnauba wax.

EXAMPLE III

The following example pertains to the formulation of a bubble gum composition including an anti-caries agent. The anti-caries agent is selected from the list of Example I, specifically Glyoxal, mesoxalic dialdehyde, succinic dialdehyde, glutaraldehyde, 2,4-hexadienal, 2-hydroxyadialdehyde, dialdehyde starch, or dialdehyde glactomannan gum. They may, as in Example I, be incorporated into the chewing gum composition of the example in parts by weight of from 0.1 to 5.0, as desired. The dialdehydes may be used alone or in a combination of two or more totalling 0.1 to 5.0 by weight percent of the gum composition.

| Ingredient | Percent by Weight |
|---|---|
| Gum base | 16.8 |
| Corn syrup | 22.4 |
| Sugar | 59.7 |
| Water | 0.3 |
| Glycerine | 0.3 |
| Flavor | 0.5 |

The gum base is softened by working in a warm mixer maintained at a temperature of 122° F. All of the corn syrup is then added, along with the anti-caries agent, followed by two-thirds of the mixture of sugar and corn sugar. When these ingredients are well mixed, water and glycerine are added, followed by the balance of the sugar mixture. Finally, the flavor is incorporated. As soon as all the ingredients have been thoroughly mixed, the batch is discharged, allowed to cool slightly, and formed into individual pieces of desired shapes and sizes, and scored in the usual fashion.

It is believed manifest and apparent from the teachings set forth hereinbefore and the specific examples provided that many different components and materials may be utilized in the manufacture of compositions in accordance with the spirit of the invention. Also, new materials, including synthetic resins and polymeric materials, are constantly being developed and made commercially available, many of which, undoubtedly, will be found useful in the manufacture of the compositions of the invention. It is, therefore, not only impossible to attempt a comprehensive catalog of useful components at this time and, further, to attempt to comprehend and describe the invention in its broader aspects in terms of the physical and chemical nomenclature of the components used herein might tend to be misleading. It is believed that the invention lies, at least in part, in the physical relation or mechanical correlation of suitable components and their individual composition is important only in the manner that individual properties of elements of any mechanical assemblage are important to their proper combination and coaction. Therefore, to formulate a set of specifications for compositions of the invention in the light of the present disclosure obviously will call for chemical knowledge and skill without departing from the spirit of the invention. It is believed the office of the chemist, chemical engineer and the like will be similar to that of the mechanical engineer who prescribes, in the construction of a machine, the proper materials and the proper dimensions therefor. From his knowledge as a chemist of the materials available, he will know or deduce, with confidence, their applicability to the achievement of the objects and purposes of the invention or, otherwise, and in the case of novel materials routine tests not necessarily of an inventive nature will provide reliable data for such determination. In analogy to the case of a machine wherein the use of certain materials of construction or dimensions of parts would lead to no practically useful result, various materials will be rejected as inapplicable while others operative as such and illustrative of the theoretical basis of the invention may not be practically useful because the significant temperatures or ranges of temperatures involved would not be particularly advantageous or find a particular application in the practical arts or because of consideration of the cost of the materials, etc. Thus, it is believed that it can be safely assumed that no one skilled in the art would wish to make a useless composition or would be misled because it is possible to misapply the teachings of the present disclosure in order to do so.

What is claimed and desired to be secured by United States Letters Patent is:

1. Chewing gum containing an effective amount of succinic dialdehyde to give the gum anti-caries activity.
2. The chewing gum composition of claim 1 wherein succinic dialdehyde is present in an amount of about 3 percent by weight of the chewing gum composition.
3. Chewing gum containing an effective amount of mesoxalic dialdehyde to give the gum anti-caries activity.
4. The chewing gum composition of claim 3 wherein mesoxalic dialdehyde is present in an amount of about 3 percent by weight of the chewing gum composition.
5. Chewing gum containing an effective amount of 2-hydroxadipaldehyde to give the gum anti-caries activity.
6. The chewing gum composition of claim 5 wherein 2-hydroxyadipaldehyde is present in an amount of about 3 percent by weight of the chewing gum composition.
7. The chewing gum containing an effective amount of dialdehyde starch to give the gum anti-caries activity.
8. The chewing gum composition of claim 7 wherein dialdehyde starch is present in an amount of about 3 percent by weight of the chewing gum composition.
9. Chewing gum containing an effective amount of dialdehyde galactomannan gum to give the chewing gum anti-caries activity.
10. The chewing gum composition of claim 9 wherein dialdehyde galactomannan gum is present in an amount of about 3 percent by weight of the chewing gum composition.

* * * * *

UNITED STATES PATENT OFFICE
CERTIFICATE OF CORRECTION

Patent No. 3,679,792          Dated July 25, 1972

Inventor(s) JOHN H. LITCHFIELD and VICTOR G. VELY

It is certified that error appears in the above-identified patent and that said Letters Patent are hereby corrected as shown below:

In the Abstract, line 5, "chewing" should read --chewing gum--.

In Column 1, line 4, "composition" should read --invention-- line 37, "by" should read --but--. Column 3, line 24, "succinidi-" should read --succindi- --; line 30, "nedial" should read --nedial)--; line 54, "would" should read --could--; line 67, "productio    n, percent" should read --production, percent--.

In Column 4, line 9, "Oran" should read --Oral--; in Table III, lines 11 - 22 should read as follows:

--Experimental Chewing Gum

| Agent | Percent | Base Formulation | Extraction Method | Chewing Time, Minutes | Degree of Inhibition(b) | |
|---|---|---|---|---|---|---|
| | | | | | Acid Production | Growth |
| Dialdehyde starch | 3.0 | Gum Base Spearmint flavor | Brabender | 60.0 | ++ | + |
| Dialdehyde starch | 5.0 | Ditto | Brabender | 60.0 | +++ | + |
| Succinaldehyde | 1.0 | Ditto | Brabender | 60.0 | ++ | + |

...... over

UNITED STATES PATENT OFFICE
CERTIFICATE OF CORRECTION

Patent No. 3,679,792  Dated July 25, 1972

Inventor(s) JOHN H. LITCHFIELD and VICTOR G. VELY

It is certified that error appears in the above-identified patent and that said Letters Patent are hereby corrected as shown below:

In Column 4, line 23, "inculum" should read --inoculum--.
In Column 6, line 39, "and" should read --are--.
In Column 8, line 2, "glactomannan" should read --galactomannan--.

Signed and Sealed this

Twenty-first Day of September 1976

[SEAL]

Attest:

RUTH C. MASON
Attesting Officer

C. MARSHALL DANN
Commissioner of Patents and Trademarks